US010664653B2

(12) United States Patent
Villard, Jr. et al.

(10) Patent No.: US 10,664,653 B2
(45) Date of Patent: May 26, 2020

(54) AUTOMATED STRUCTURED CLOUD DATATESTER

(71) Applicant: INTERNATIONAL BUSINESS MACHINES CORPORATION, Armonk, NY (US)

(72) Inventors: Bruce E. Villard, Jr., Arnold, MD (US); Henry C. Will, IV, Dover, NJ (US)

(73) Assignee: International Business Machines Corporation, Armonk, NY (US)

( * ) Notice: Subject to any disclaimer, the term of this patent is extended or adjusted under 35 U.S.C. 154(b) by 748 days.

(21) Appl. No.: 14/918,887

(22) Filed: Oct. 21, 2015

(65) Prior Publication Data

US 2017/0116171 A1 Apr. 27, 2017

(51) Int. Cl.
*G06F 40/18* (2020.01)
*G06F 40/103* (2020.01)
*H04L 29/08* (2006.01)

(52) U.S. Cl.
CPC ............ *G06F 40/18* (2020.01); *G06F 40/103* (2020.01); *H04L 67/10* (2013.01)

(58) Field of Classification Search
CPC ....... G06F 17/246; G06F 17/211; H04L 67/10
See application file for complete search history.

(56) References Cited

U.S. PATENT DOCUMENTS

| | | | |
|---|---|---|---|
| 5,381,517 | A | 1/1995 | Thorndike et al. |
| 5,842,180 | A | 11/1998 | Khanna et al. |
| 6,317,758 | B1 | 11/2001 | Madsen et al. |
| 6,766,509 | B1 | 7/2004 | Sheretov et al. |

(Continued)

FOREIGN PATENT DOCUMENTS

| | | |
|---|---|---|
| CA | 2788356 A1 | 2/2013 |
| WO | WO2011063340 A1 | 5/2011 |

(Continued)

OTHER PUBLICATIONS

Peter Mell et al, The NIST Definition of Cloud Computing, National Institute of Standards and Technology, U.S. Department of Commerce, Special Publication 800-145, 2011, 7 pp (entire document).
Casa-Bayona et al, Integrating Semi-structured Information using Semantic Technologies, SCITEPRESS (Science and Technology Publications, Lda.), 2014, pp. 357-364.

(Continued)

*Primary Examiner* — Kavita Padmanabhan
*Assistant Examiner* — Ahmad M El-Bkaily
(74) *Attorney, Agent, or Firm* — Patrick J. Daugherty; Daugherty & Del Zoppo Co., LPA (57) ABSTRACT

Data in different, respective ranges of spreadsheet file cells is compared, and a scope of a formula determined with respect to selected cells of the ranges of cells, wherein the formula pulls input data from selected cells of one range of cells and either pulls input data or generates output data to selected cells of the other range of cells. A review flag is automatically generated in association with data in a flagged cell in response to determining: that the flagged cell is omitted from a consecutive plurality of input data rows or columns; that the selected formula input cells are not consecutive within one of the ranges of cells; and that a high percentage of data values in corresponding cell rows or columns match but that and a location of the flagged cell is shifted from a corresponding cell within the other range.

20 Claims, 6 Drawing Sheets

(56) References Cited

U.S. PATENT DOCUMENTS

| | | | |
|---|---|---|---|
| 6,948,154 | B1 | 9/2005 | Rothermel et al. |
| 6,986,099 | B2 | 1/2006 | Todd |
| 8,407,579 | B2 | 3/2013 | Raja et al. |
| 9,158,832 | B1* | 10/2015 | Hiatt .................. G06F 17/2247 |
| 2002/0004801 | A1* | 1/2002 | Todd .................... G06F 17/246 |
| | | | 715/212 |
| 2010/0050230 | A1 | 2/2010 | Aebig et al. |
| 2010/0050264 | A1 | 2/2010 | Aebig et al. |
| 2012/0137204 | A1 | 5/2012 | Petrovicky et al. |
| 2013/0231904 | A1* | 9/2013 | Jones ...................... G06F 17/18 |
| | | | 703/2 |
| 2016/0055139 | A1* | 2/2016 | Creason ............... G06F 17/246 |
| | | | 715/217 |

FOREIGN PATENT DOCUMENTS

| | | |
|---|---|---|
| WO | WO2012003266 A1 | 1/2012 |
| WO | WO2012158649 A2 | 11/2012 |

OTHER PUBLICATIONS

Dam Sunwoo et al, Early Models for System-level Power Estimation, Eighth International Workshop on Microprocessor Test and Verification, IEEE, 2008, pp. 8-14.

Microsoft et al, Handling Local Variables in Spreadsheet Formulas, IP.com No. 000175961, IP.com Electronic Publication, 2008, pp. 1-22.

Disclosed Anonlymously, Methods for handling structure data on spreadsheet, IP.com No. 000195296, IP.com Electronic Publication, 2010, pp. 1-5.

Camenisch et al, Privacy and Identity Management for the Future Internet in the Age of Globalisation, 9th IFIP WG, International Summer School, http://www.springer.com/series/6102, 2014, 4 pp (entire document).

Rodriguez-Cano et al, Event Invitations in Privacy-Preserving DOSNs, Formalization and Protocol Design, IFIP International Federation for Information Processing, 2015, pp. 185-200.

* cited by examiner

AUTOMATED STRUCTURED CLOUD DATATESTER

BACKGROUND

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Structured cloud data includes spreadsheets and other similar databases and structures that are stored in the cloud.

Structured data may be subject to input errors and other variations or anomalies that negatively impact data quality. In the prior art the discovery of such errors and variations is often made long after negative effects on the structured data have occurred, for example, months after a found error has occurred and already generated bad data outputs over the intervening time from occurrence to detection.

Complex formulas, macros, and other programming solutions may be created and deployed within structured cloud data systems in order to avoid the effects of data errors and variations. However, such solutions require the expenditure of significant or sophisticated programming resources, and even then adequate programming solutions may be beyond the skills of many users. Other solutions for resolving these type of structured cloud data errors rely on manual review of the structured cloud data results by very experienced employees, which can be cumbersome costly in terms of available time and resources.

BRIEF SUMMARY

In one aspect of the present invention, a method for a structured cloud data analyzer includes comparing data in different, respective (for example, first and second) ranges of spreadsheet file cells, and determining a scope of a formula with respect to selected cells of the first range of cells and selected cells of the second range of cells, wherein the formula pulls input data from the selected cells of the first range of cells and pulls input data from selected cells of the second range of cells or responsively generates output data to revise the data within each of the selected output cells of the second range of cells. A review flag is automatically generated in association with data in a flagged cell selected from one of the ranges of cells in response to determining: that the flagged cell is omitted from a consecutive plurality of input data rows or columns of the selected formula input cells; that the selected formula input cells are not consecutive within one of the ranges of cells; and that a high percentage of data values in respective corresponding rows or columns of the ranges of cells match, and that a location of the flagged cell within one of the range of cells is shifted by at least one row or column from a corresponding cell within the other range of cells.

In another aspect, a system has a hardware processor in circuit communication with a computer readable memory and a computer-readable storage medium having program instructions stored thereon. The processor executes the program instructions stored on the computer-readable storage medium via the computer readable memory and thereby compares data in different, respective (for example, first and second) ranges of spreadsheet file cells, and determines a scope of a formula with respect to selected cells of the first range of cells and selected cells of the second range of cells, wherein the formula pulls input data from the selected cells of the first range of cells and pulls input data from selected cells of the second range of cells or responsively generates output data to revise the data within each of the selected output cells of the second range of cells. A review flag is automatically generated in association with data in a flagged cell selected from one of the ranges of cells in response to determining: that the flagged cell is omitted from a consecutive plurality of input data rows or columns of the selected formula input cells; that the selected formula input cells are not consecutive within one of the ranges of cells; and that a high percentage of data values in respective corresponding rows or columns of the ranges of cells match, and that a location of the flagged cell within one of the range of cells is shifted by at least one row or column from a corresponding cell within the other range of cells.

In another aspect, a computer program product for a structured cloud data analyzer has a computer-readable storage medium with computer readable program code embodied therewith. The computer readable program code includes instructions for execution which cause the processor to compare data in different, respective (for example, first and second) ranges of spreadsheet file cells, and determine a scope of a formula with respect to selected cells of the first range of cells and selected cells of the second range of cells, wherein the formula pulls input data from the selected cells of the first range of cells and pulls input data from selected cells of the second range of cells or responsively generates output data to revise the data within each of the selected output cells of the second range of cells. A review flag is automatically generated in association with data in a flagged cell selected from one of the ranges of cells in response to determining: that the flagged cell is omitted from a consecutive plurality of input data rows or columns of the selected formula input cells; that the selected formula input cells are not consecutive within one of the ranges of cells; and that a high percentage of data values in respective corresponding rows or columns of the ranges of cells match, and that a location of the flagged cell within one of the range of cells is shifted by at least one row or column from a corresponding cell within the other range of cells.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), astatic random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
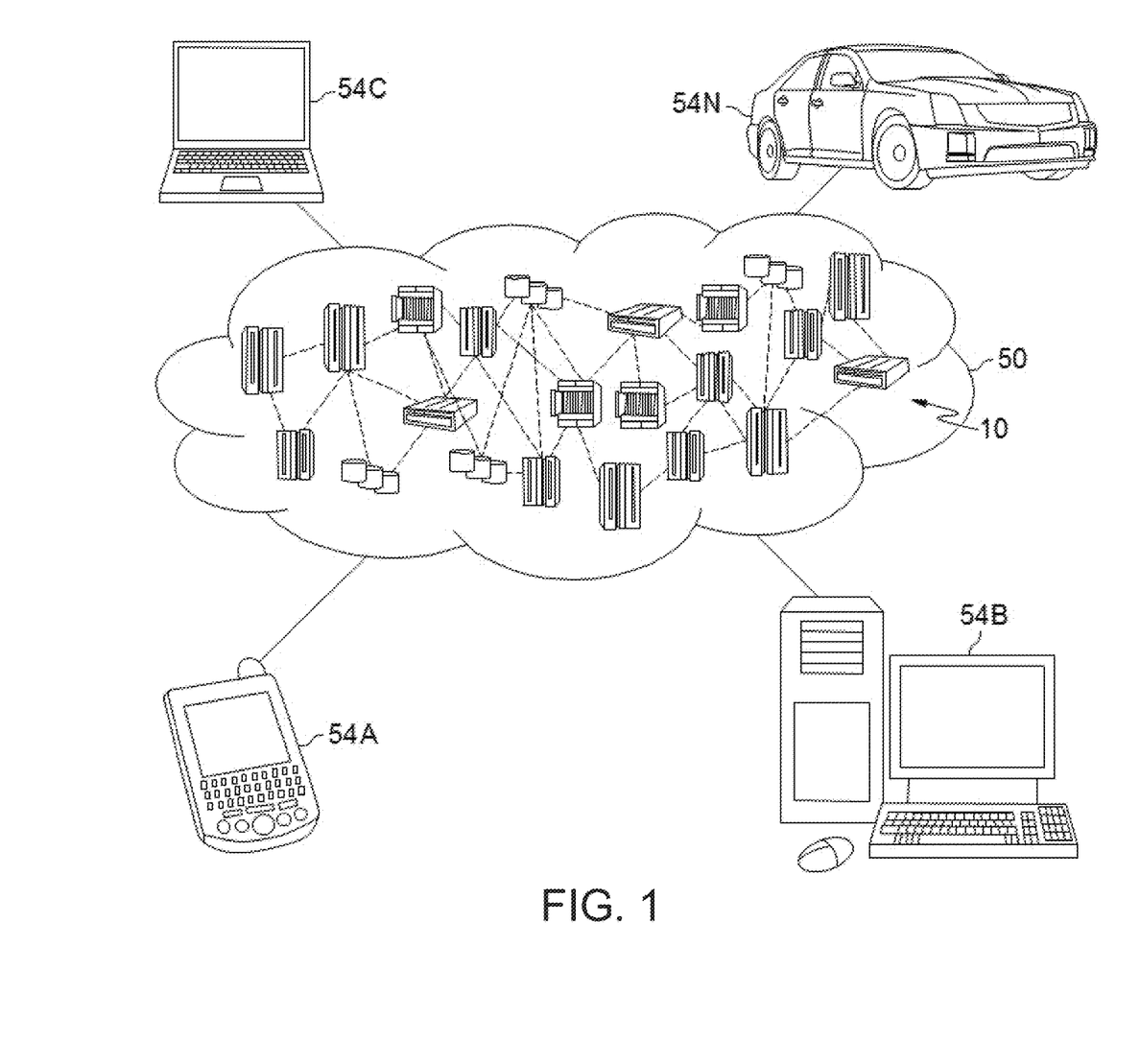
FIG. 1 depicts a cloud computing node according to an embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
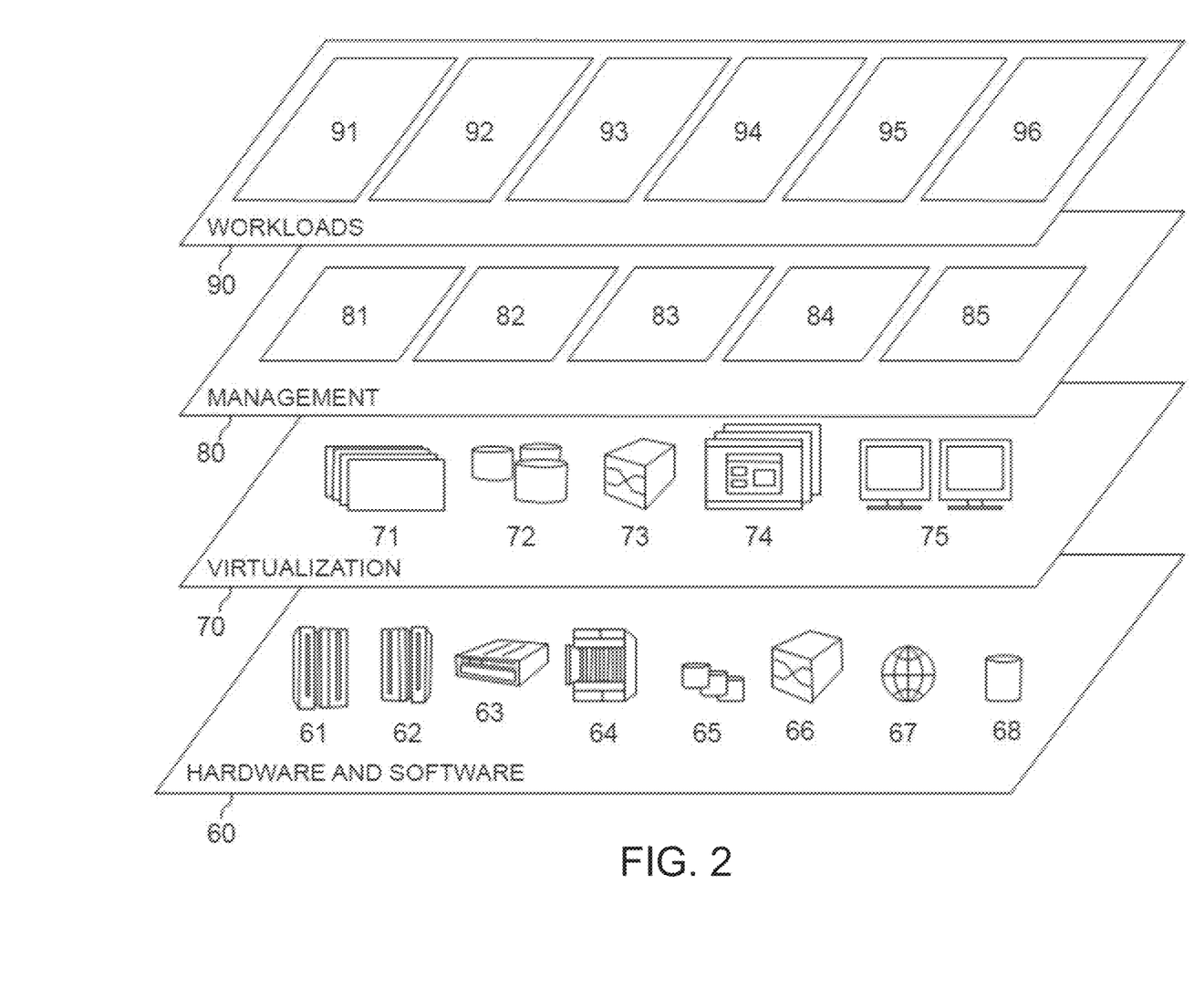
FIG. 2 depicts a cloud computing environment according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 for an automated database manager that selectively applies different constraints of a hybrid constraint definition to a table data field of a relational database management system as described below.

Figure 3:
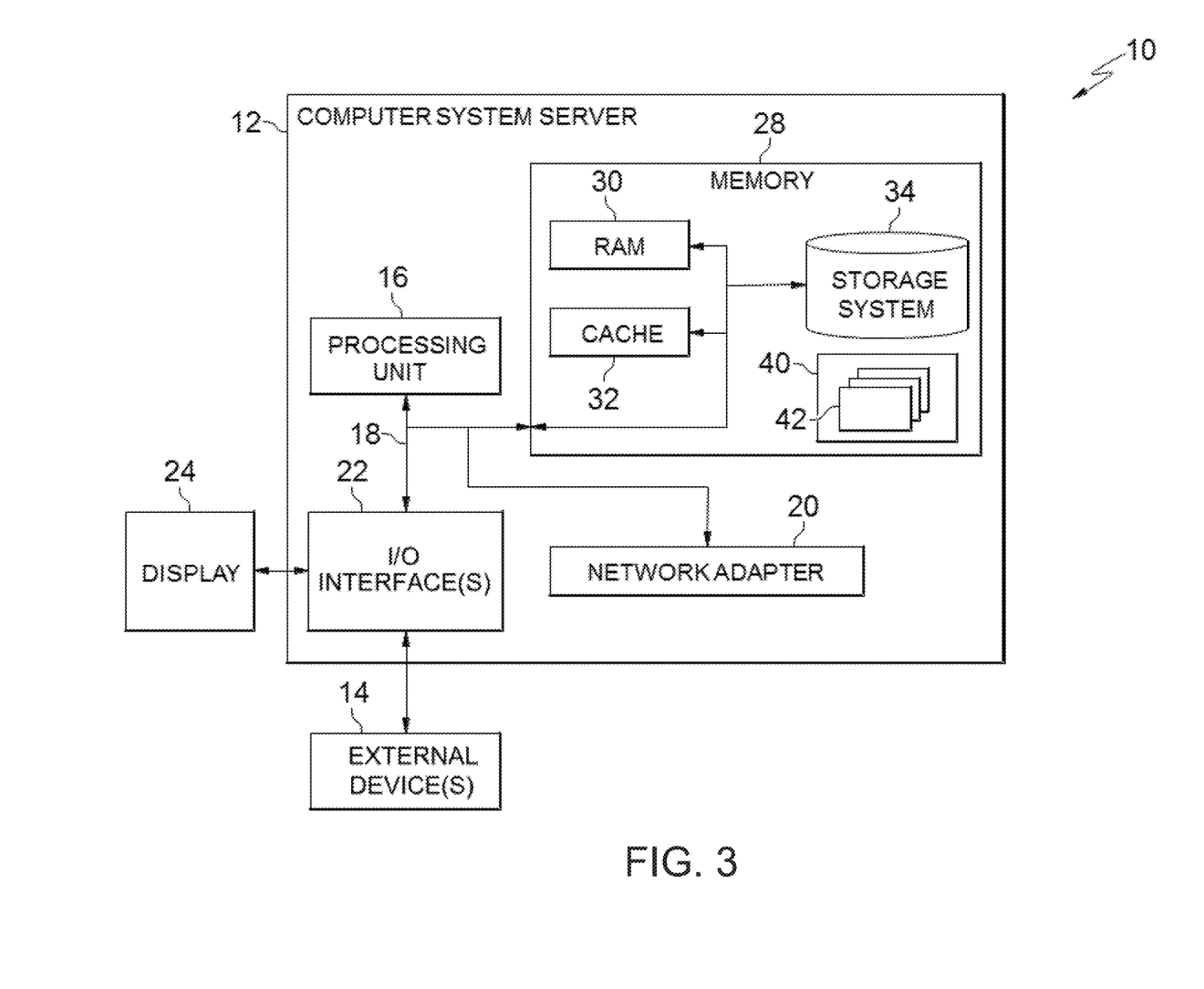
FIG. 3 depicts a computerized aspect according to an embodiment of the present invention.

FIG. 3 is a schematic of an example of a programmable device implementation 12 according to an aspect of the present invention, which may function as a cloud computing node within the cloud computing environment of FIG. 2. Programmable device implementation 12 is only one example of a suitable implementation and is not intended to suggest any limitation as to the scope of use or functionality of embodiments of the invention described herein. Regardless, programmable device implementation 12 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Aspects of the present invention provide systems and methods for a structured cloud data analyzer. For example, FIG. 4 (or "FIG. 4") illustrates a computer implemented method or process of an aspect of the present invention wherein a processor (for example, a central processing unit (CPU)) executes code, such as code installed on a storage device in communication with the processor, and thereby performs the process step elements illustrated in FIG. 4.

Figure 4:
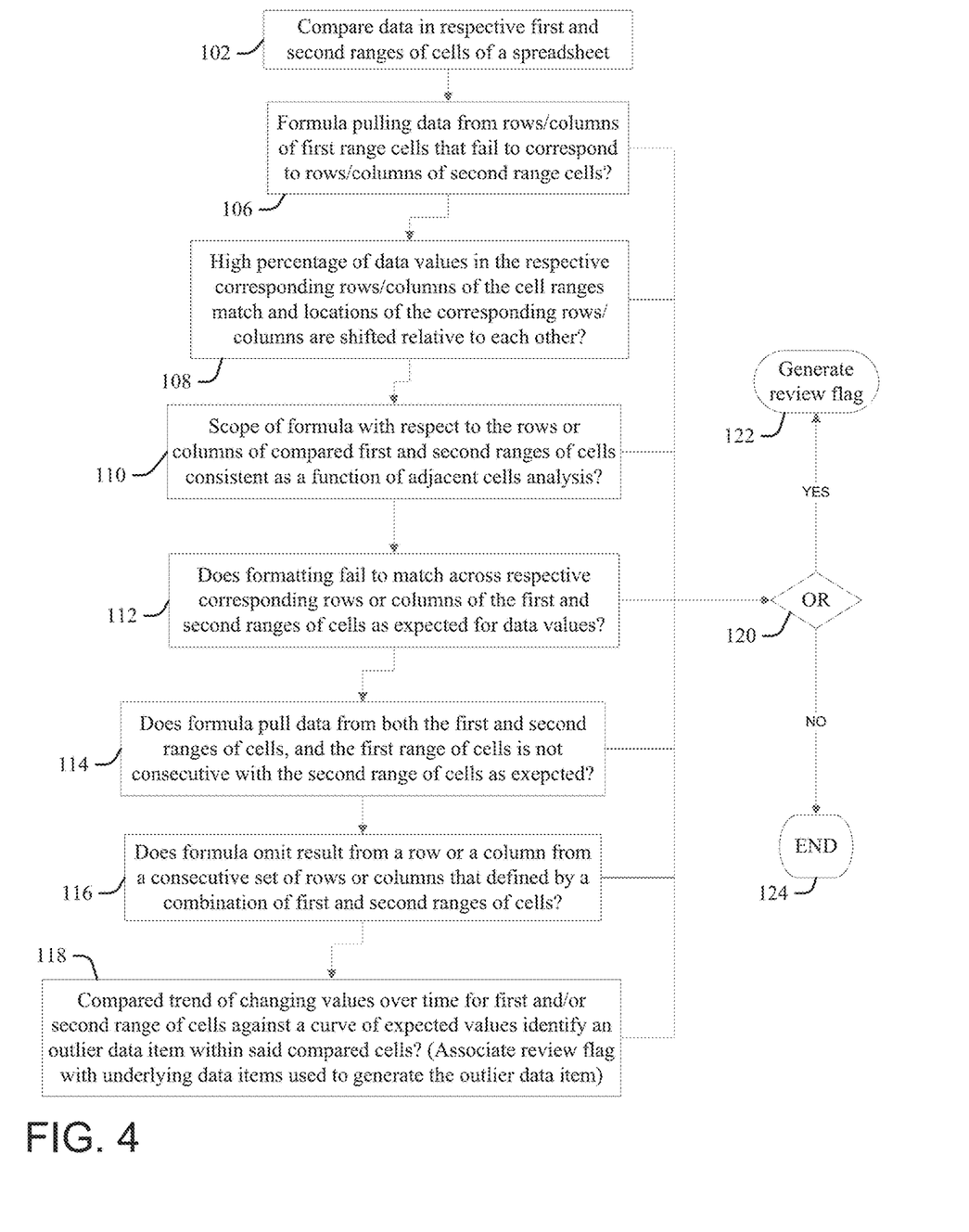
FIG. 4 is a flow chart illustration of a method or process according to an embodiment of the present invention for a structured cloud data analyzer.

At 102 the processor compares data in each of a plurality of cells of a first range of cells of a spreadsheet file to a data in each of a plurality of cells of a second range of cells of the spreadsheet file to determine differences in their respective data values or attributes. The comparison forms the basis for each of a plurality of different determinations at 106, 106, 110, 112, 114, 116 and 118 as described below, wherein positive "Yes" (or otherwise defined) determinations at any one results in an automatic generation of a review or error flag (message, etc.) at 122, which is graphically illustrated by an "OR" combination at 120 of each respective determination output. It will be understood that there may be overlap between data values or attributes that are identified as different across the compared cells. Otherwise, if none of the determinations have a positive output, then the process ends at 124 without generation of a review flag.

The determinations at 106, 110, 112, 114, 116 and 118 may be differentiated to whether or not the first compared range of cells are on a first sheet of the spreadsheet file that is different from a second sheet of the spreadsheet file that includes the second range of cells, wherein multi-sheet specific comparisons are each performed. It will be understood that the aspect of FIG. 4 is only an illustrative but not limiting or exhaustive example, and that other aspects of the present invention may not differentiate between applied determinations based on multi-sheet comparison criteria or otherwise distinguish between selection of determinations based on commonality or differences of spreadsheet location, and some aspects may omit one or more of the determinations at 106, 106, 110, 112, 114, 116 and 118 as described below, or add still other determinations.

At 106 the process determines whether a formula is pulling data from a first set of row or column locations of the first range of cells and from another set of row or column locations of the second range of cells, wherein information items within the respective sets of row or column locations fail to correspond to each other across the ranges of cells. Examples of the information items include formulas, data values, and format values. In one example a user creates a complex system of spreadsheets that are linked, wherein several spreadsheets have multiple pages. The user, while writing formulas for pulling data from one sheet to another, creates a formula misalignment by mistake, wherein a "March Sales" sheet has formulas pulling data from the other two sheets for sales for the month of March, one of which ("Hardware Sales") is being pulled from rows starting at 100 (corresponding to hardware sales in March), but also pulling data from row 101 (corresponding to data for the month of April) from another ("Software services") sheet. At 106 the process compares the formulas and identifies that the formula is pulling data from one sheet for one set of rows, but from a different set of rows on the other sheet, resulting in generation of a review flag.

Aspects of the process at 106 may also look at the headings for the rows and thereby determines that row 100 on the "Hardware Sales" sheet is labeled in Column A as March 2013 while Row 101 on the "Software Services" sheet has column A labeled as "April 2013," wherein the difference in text content of the respective column A labels also results in generation of a review flag.

At 108 the process determines whether a high percentage of data values in the respective corresponding rows or columns of the first range of cells and the second range of cells match, and that locations of the corresponding rows or columns of the first range of cells and the second range of cells of the highly-matching data are shifted relative to each other by one row or column. Matching data values may include one or more of pattern, values, and formatting matching. In one example the process at 108 indicates that a user has likely pasted data into a spreadsheet incorrectly, wherein the data is pasted one column to the right of where it should be. The process determines at 108 that a high percentage of data in two columns match, in effect because the data was pasted a column to the right and old data was left in the one, leftmost column that was not pasted over by the new data, resulting in generation of a review flag.

The process at 108 may also compare the data from last month's spreadsheet with the data from this month's spreadsheet and determines that the new data correlates (within a certain percentage because the data may have changed somewhat) to last month's data, but is moved over by one column, resulting in generation of a review flag. Comparing data trends to find that a data trend over time for one column does not match a trend on another column may also result in generation of a review flag at 108.

At 110 the process determines whether the scope of formula with respect to the rows or columns of the compared first and second ranges of cells is consistent as a function of adjacent cells analysis. In one example the process at 110 determines whether a third "end product" sheet of the spreadsheet file uses another (second) look-up formula to refer to a "lookup table" comprising a first number of rows or columns within the first range of cells on the first sheet, wherein the lookup table data is pulled by formula from an "originating table" comprising a second number of rows or columns within the second range of cells on the second sheet of the spreadsheet file. In response to a user adding new rows to the originating table that corresponding increase the second number of rows or columns within the second range of cells on the second sheet of the spreadsheet file to a revised second number, the processor automatically generates the review flag in response to determining that the second look-up formula refer to a number of rows or columns that is less than the revised second number of rows or columns within the second range of cells on the second sheet.

For example, assume a user creates a complex spreadsheet wherein the "end product" sheet has formulas that do lookups that refer to the lookup table in another sheet that has 100 rows, wherein the lookup table pulls data from originating tables on another sheet has 100 rows. The user adds new rows to the originating table that increases it to 200 rows, which in turn adds correspondingly to the number of rows in the lookup table so that it now also has 200 rows. However, a lookup formula in the end product sheet does not include these additional rows, but looks only to the first 100 rows, and therefore the end product sheet will not find the data in the last 100 of the 200 rows. The process at 110 determines that the end sheet formula uses the first 100 rows, but that the table goes on for 200 rows, resulting in generation of a review flag.

In another example, where a user provides both a current spreadsheet and a previous spreadsheet, the process at 110 may compare the two versions of the same sheet and determine that while the lookup table has increased in size to 200 rows; the formulas that use the first 100 rows did not change, resulting in generation of a review flag.

Figure 5:
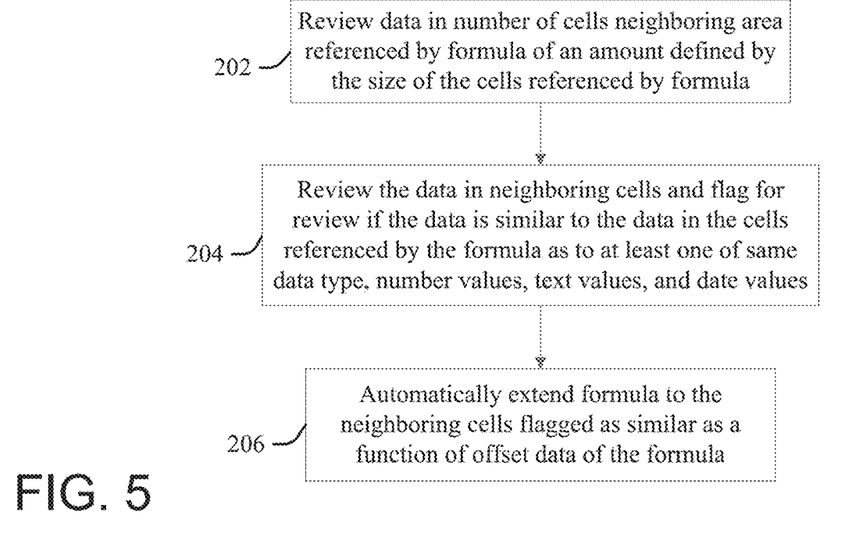
FIG. 5 is a flow chart illustration of another method or process according to an embodiment of the present invention for a structured cloud data analyzer.

FIG. 5 illustrates one example of a process at 110 (FIG. 4) that determines formula consistency for data pulled from the sets of rows and columns of the first and second range of cells as a function of examining the contents of rows/columns that are near or adjacent to said cell ranges. Thus, at 202 the process reviews the data in cells neighboring to the area being referenced by a formula in an amount defined by the size of the cells referenced in the compared ranges of cells. The dimension for identifying adjacent, neighboring cells may vary, and in one example the process searches neighboring cells in an amount of 10% of the number of cells in the currently defined lookup area of the first and or second ranges of compared cells. For example, if cells C1000:F4000 are referenced by the formula, then the process at 202 reviews 10% of 3000, or 300 cells, above and below, which would correspond to C700 through F4300.

At 204 the process reviews the data in these neighboring cells and flags each one for review if the reviewed data is similar to data in the cells referenced by the formula as to at least one of same data type, number values, text values, or date values. In the present example, the ones of the adjacent cells within C700: F3999 and/or C4001:F4300 that have a data types that is similar to the data types in the C1000: F4000 range are flagged for review.

At 206 the formula is automatically extended to the neighboring cells flagged as similar at 204 as a function of offset data of the formula. For example, if the formula is a "vlookup" that specifies C1000:F4000 for an allowable range, then since the neighboring cells flagged as similar at 204 are outside of this range, an offset used to extend the formula at 206 to the neighboring cells flagged as similar at 204.

Returning again to FIG. 4, at 112 the process generates review flags in response to determining that formatting does not match across respective corresponding rows or columns of the first range of cells and the second range of cells. For example, the process at 112 checks all rows on each sheet to see if formatting is the same across columns and rows. If there is a section of the sheet where formatting is the same for a number of rows or columns, but there is another that has have variants in formatting relative to this pattern, then they are flagged for review. In some aspects the user may specify that the process automatically fixes the issue, by correcting the formatting of the flagged portions to correspond to the expected formatting pattern.

Figure 6:
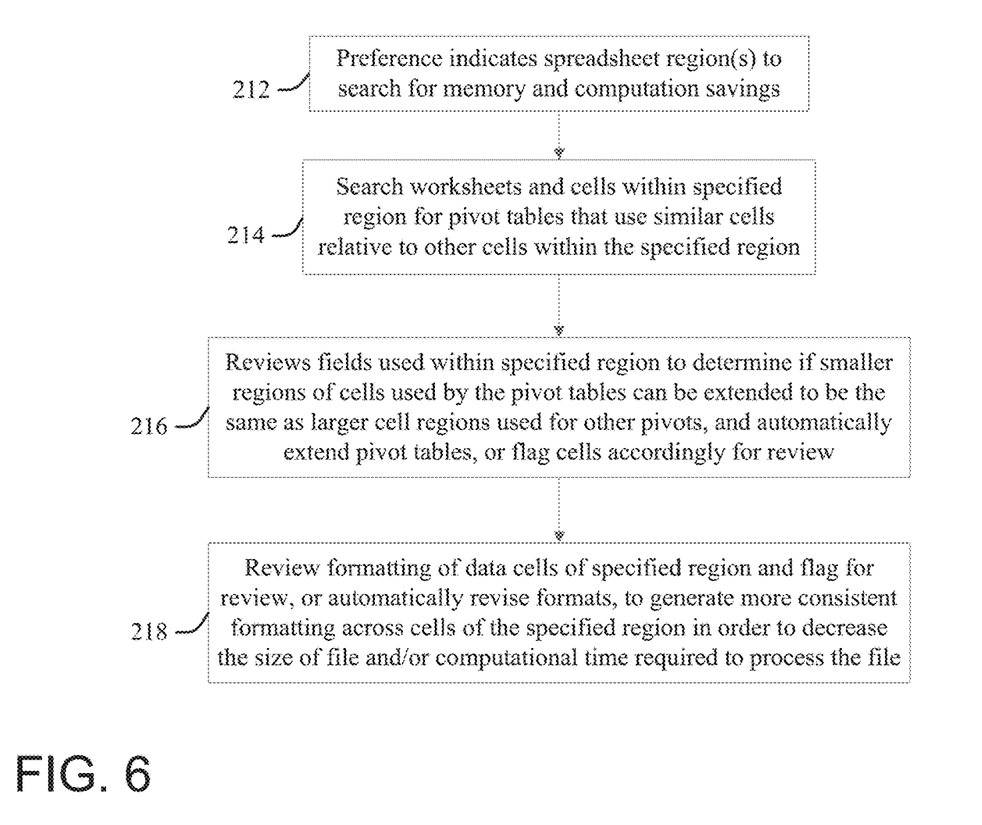
FIG. 6 is a flow chart illustration of another method or process according to an embodiment of the present invention for a structured cloud data analyzer.

Aspects may match formatting across the compared ranges of cells at 112 to achieve memory and computational savings. FIG. 6 illustrates one variation of the process of 112 (FIG. 4) wherein at 212 a user or system preference indicates one or more specified regions of a spreadsheet to search for memory and computation savings (i.e. if only certain sheets and areas of spreadsheet are to be searched).

At 214 the process searches worksheets and cells within the region specified at 212 for pivot tables that use very similar cells relative to other cells within said specified region.

At 216 the process reviews fields used within the specified region and determines smaller regions of cells used by the pivot tables can be extended to be the same as larger cell regions used for other pivots, and automatically extend pivot tables accordingly, or flag associated cells for review.

At 218 the process reviews formatting data in the cells and flags these for review, or automatically renders formatting more consistent (including by removing some formatting from some of the cells), in order to decrease the size of the file and computational time required to process the file. For example, date and number formatting mixed in a column may be automatically corrected to have only date formatting.

Referring again to FIG. 4, at 114 the process determines whether a formula is pulling data from both of the first and the second range of cells and that the first range of cells is not consecutive with the second range of cells. For example, a user while writing formulas for pulling data from one sheet to another creates a formula misalignment by mistake, wherein first quarter numbers are pulling from January, February, and March, but 2nd quarter numbers are pulling from May, June, and July (rather than March, April and May). The process at 114 looks at the formulas and identifies that the second formula is pulling data from a set of cells that are not consecutive from the first (the cells for the second quarter months of March, April and May have been skipped), resulting in generation of a review flag. The process at 114 may also compare row headings or underlying data and thereby determine that the quarter row marked as "2Q2013" is tallying data where the header (or the underlying data) is from the months May, June, and July that do not correspond to a "2Q" quarter row, resulting in generation of a review flag as a possible incorrect quarterly calculation. With respect to underlying data, processes according to the present invention may look at 114 at how formulas are pulling data from weekly numbers and generate the review flag in response to recognizing that the weekly numbers are being pulled from the incorrect months.

At 116 the process determines whether formulas consistently use each row or column from a consecutive set of rows or columns that is defined by a combination of the first range of cells and the second range of cells, either for a same number of time, or if one or more are omitted from a result of the formula. For example, a user creates two formulas that total all sorts of numbers for rows above, wherein one formula includes rows 2, 3, 6 and 9, and another formula totals rows 4, 7 and 8. Comparing the formulas at 116 determines that row 5 is left out of the respective totals, resulting in generation of a review flag.

Figure 7:
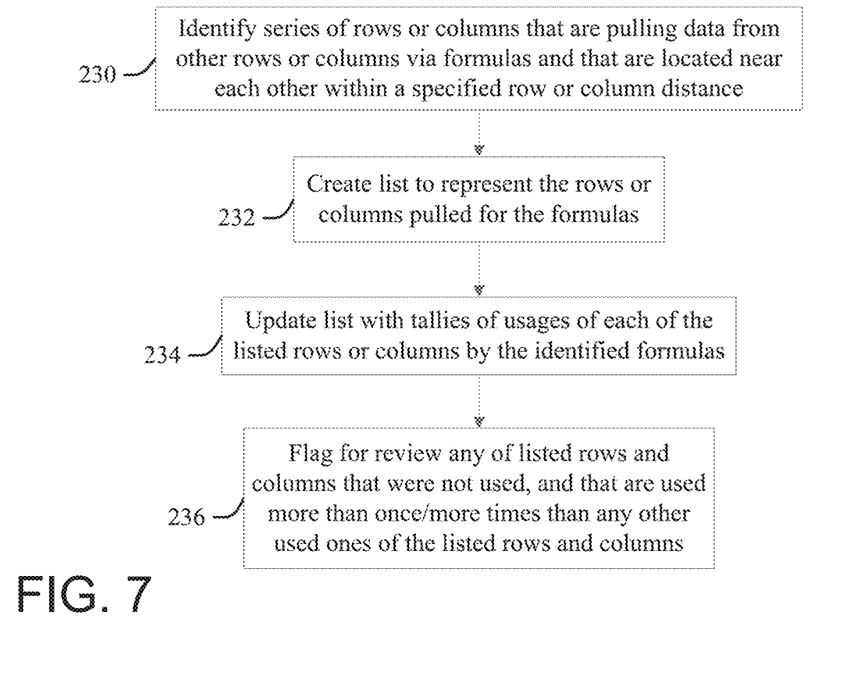
FIG. 7 is a flow chart illustration of another method or process according to an embodiment of the present invention for a structured cloud data analyzer.

FIG. 7 illustrates an example of another aspect that determines formula row and column usage consistency at 116 as a function of "nearness" of rows/columns to each other, thereby limiting the areas of spreadsheets considered at 116. Thus, at 230 the process looks for a series of rows or columns that are pulling data from other rows or columns pursuant to one or more identified formulas and that are located near each other within a specified row or column distance. For example, three formulas for rows that are near to each other, for rows 101 to 103, are pulling data from a series of other rows above and in the same spreadsheet, for example rows 10 through 40, which are within a distance specified at 230.

At 232 a list is created to represent the rows or columns that are being pulled for the formulas. For example, a list is created to represent rows 10 through 40.

At 234 the process updates the created list with tallies of usages of each of the listed rows or columns by the identified formulas. For example, a first formula totals rows 10 through 17 and multiplies by row 40 so each is marked with one usage tally. A second formula includes rows 19, 23, 35-39 in a calculation, so they are marked with additional usages. The third formula uses rows 21, 24-29, 31 and 40, so they are marked with additional usages in the list.

At 236 the process flags for review any of the listed rows and columns that were not used (that have usage tally counts of zero), and any of the listed rows and columns that are used more than once, or more times than any other used ones of the listed rows and columns (that have usage tally counts of two, or of one more than any other non-zero tally count of others of the listed rows and columns). Thus, in the present example rows 18, 20, 22, 30, 32-34 are flagged as "not used," and row 40 is flagged as "used twice."

Returning again to FIG. 4, at 118, the process further compares a trend of changing values that is determined over time for at least one the first range of cells and the second range of cells against a matching algorithm output (curve, projection, waveform, cycle, etc.) of expected values to identify an outlier data item within one of the first range of cells and the second range of cells, as a function of the outlier data item failing to match the curve of expected values. Time values may be determined by date-related information in the spreadsheet, as well as by dates of spreadsheet pages or files. In this case, the review flag automatically generated at 114 is associated with a set of underlying data items that are used to generate the outlier data item as a function of an outlier data item formula.

In one example, a user updates monthly spreadsheet report that computes Gross Profit (GP), and the process at 118 reviews a trend of GP, matching it against standard curves (geometric, exponential, etc.) to find a best fitting curve. This comparison finds that there is an outlier in the data, resulting in generation of a review flag for the GP outlier.

The process at 118 may further look at formulas used to generate the GP outlier and find that the GP is calculated by subtracting expenses from revenue, which in turn causes the process to look at the values for the expenses and revenue and match them to a "best fitting curve" for said data. This curve matching analysis determines that the expense for the GP outlier is more than the revenue for the same outlier, which results in generation of a review flag for the expense outlier as a likely, causal error.

The process at 118 may also look at the formulas used to calculate the expenses and finds that the expenses for the month are compiled by adding the weekly expenses, which results in a review of the weekly expenses and a matching to a "best fitting curve" for said data that determines that the second week of expenses is an outlier, which is accordingly flagged for review for possible error. The process may also find that the formula for the second week outlier is adding up several individual line items, wherein each of the line items are reviewed to see which line items contribute most to this second week expense outlier, finding that server costs and the travel expenses for that month are the biggest contributor to the outlier, and each is accordingly flagged for review. Digging still deeper into the underlying data, the process at 118 looks at the formulas used to determine each of the server costs and the travel expenses items, finds that "server 6" and "salesperson B" are the biggest contributors to each of these outliers, and accordingly flags them for review as well.

The determinations within aspects of the present invention may be executed in batch processes, as a function of structured cloud data with specified processing parameters. Batch processes provide advantages in enabling users to process the same spreadsheet file on a regular basis, for example weekly, to maintain data integrity on an ongoing basis as the data fields are updated, added or deleted. The aspects may also be executed in response to user initiated prompts, wherein the process is interactive with the user and enable the user to try different "what if" input scenarios for review and comparison of the different outputs.

Aspects of the present invention solve problems in the prior art wherein errors and variations in structured cloud data are not found prior to generating data processing outputs for user clients, sometimes months afterwards. Common copy and paste mistakes may not be readily detected, resulting in skewed numbers provided by structured cloud data processes. Alternatively, there may be a business reason associated with numbers having a significant variation, but identifying this root cause requires timely investigation, wherein such errors and variations are not found under the prior art until months afterwards, which results in the generation of faulty output data over the intervening time period, and which may be after business decisions have already been made based on the faulty output.

It is known under the prior art to deploy data constraint functions that check to make certain that data values are within certain tolerances, check that values are consecutive (no numbers missed in a sequence), that items are included in a list of valid values, etc. However, structured cloud data files are often very large or complex, thus resulting in slow loading and response times. To deploy data constraint function approaches within a structured cloud data environment under the prior art generally requires the creation and deployment of complex formulas, macros, and other programming resources that are inefficient, costly and perhaps beyond the reach of many users. Other prior art approaches rely on manual review of structured cloud data results by experienced employees to spot problems in the underlying data, which is costly in terms of manpower and other human resources costs.

Aspect of the present invention recognize and respond efficiently to different categories structured cloud data errors, not by conventional data constraint functions, but by instead selectively performing different comparison determinations that are appropriate to different categories of structured cloud data errors, for example via selecting and deploying appropriate ones of the determinations at 106, 110, 112, 114, 116 and 118 of FIG. 4. For example, structured cloud data may be set up to use a wrong row or column for this month's input data, due to a simple typographic date entry error ("typo") in setting up a function so the calculations are using the wrong month for data and the numbers are off. Such an error is not easily detected under the prior art data constraint approach. Copy and paste errors from another structured cloud data entity can also cause errors that are not easily detected.

In contrast, aspects of the present invention build a set of functions and analytics directly into the structured cloud data, for example via deploying a "Structured Cloud Data Analytics" processor that is configured to perform the processes of FIG. 4. The outputs of said functions and analytics provide easy solutions to errors in the structured cloud data, and help answer questions such as "Why are we not making a profit this month?", "From where are the costs coming?" and "Why is there a large variation in the numbers?".

Aspects of the present invention perform root cause analysis to determine why compared data numbers have changed, and trace back formulas to root data to see which root data has changed. Data entry errors resulting from data pasted in the wrong place are recognized, for example, by determining if formulas are overwritten by data, and also via using trend analysis. Formula inconsistencies from copying formulas into wrong locations are recognized. Users may also provide boundaries to check normal ranges during the data comparisons. Trend analysis may look for anomalies in data change trends, for example generating a review flag if numbers that usually change over time by 10% instead change by 20%.

Although examples of the present invention discussed herein focus on relational spreadsheet data and the cloud, aspects of the invention are not limited to relational spreadsheet data or cloud-based platforms. Thus, aspects of the present invention may be applied to other data-based forms and associated computational formulas created, manipulated or stored on the cloud or in an on-premises location or a local workstation. As such, spreadsheet-directed terms such as "cell," "column," and "row" can be used interchangeably with other terms for data storage and manipulation (for example, "field," "datum", etc.). As will be appreciated by one skilled in the art, aspects may be practiced in a variety of domains, including within DB2® and other Structured Query Language ("SQL") SQL environments, and NoSQL ("non SQL" or "non-relational") database mechanisms for storage and retrieval of data that are modeled in means other than the tabular relations used in relational databases. (DB2 is a trademark of International Business Machines Corporation in the United States or other countries.) DB2 is common server product that is designed with a common code base to run on different platforms, and supports a relational model as well as object-relational features and non-relational structures such as JavaScript™ Object Notation (JSON) and Extensible Mark-up Language (XML). (JAVA and all JAVA-based trademarks and logos are trademarks or registered trademarks of Oracle and/or its affiliates in the United States or other countries.)

Business processes often track time and expenses incurred by contractors, suppliers, and vendors on a particular project, especially those projects that are based on a time-and-materials agreement. Procuring organizations generally need to track and watch expenses as they are submitted by contractors, suppliers, and vendors, and then either approve or reject the invoice. This can be very time-consuming and when working on a project deadline or under other time constraints. The procuring organization might not be able to devote the time to analyze each and every invoice data point submitted by a supplier, and accordingly may miss supplier mistakes and unintentional or intentional time and expense padding.

Aspects of the present invention may be applied to structured cloud data to examine invoice data submitted by a supplier for business outlier variations that prompt root cause or trend analysis to save the procuring organization time, supplier expense and other costs. A user may set structured cloud data value tolerances based on multiple factors including: how well the data from a current invoice aligns with invoices from similar suppliers or projects; limits and standards set by a procuring organization; and analytics derived from past history of invoice submissions on a project. This enables aspects to identify anomalies via trend analysis (at 118, FIG. 4), to determine for example that a supplier expends 100 hours of work effort during a third week of every month for repeating, legitimate and approved business reasons, but only 60 hours of work effort on average during the first, second, and fourth weeks of a month, and tot thereby flag for review supplier invoicing for services closer to 100 hours than to 60 hours for any given first, second or fourth week of a month.

Examples of ranges of cell data useful for comparison purposes to flag outlier data via the processes of FIG. 4 include previously-submitted invoice data from similar suppliers or from other similar projects; limits or standards (for example, conventional travel expense per diems for a particular city) set by a procuring organization; historical or analytical data derived from previous invoices submitted by this supplier on this project. The determinations shown in FIG. 4 may thus be used to flag for review any data that does not fit in with or align with data from acceptable, defined and established criteria.

Medical insurance providers may also use aspects of the present invention to analyze claim submissions for anomalies or other claims problems that may indicate improper or erroneous claims. Medical insurance providers track claims paid for doctor services, pharmaceuticals, and medical devices. The volume of insurance claims processed necessitates an efficient method to spot erroneous claims, and aspects of the present invention may quickly and efficiently spot problem claims as a function of data mistakes and misalignments detected and flagged by the process of FIG. 4. Aspects of the present invention may also offer advantages in reducing claim review time and resources, enabling a user to focus on the data flagged for review rather than all data files.

Examples of structured medical claims cloud data values appropriate for consideration and determinations at the steps of FIG. 4 include setting tolerances based on multiple factors including: how well data from a current claim aligns with invoices from other players in the insurance industry (if such information is available); limits and standards set by claim types and benefits chosen by a claimant; analytics derived from past history of claim submissions by a claimant (for example, has the claimant been previously approved for a regular course of treatment that would normally otherwise be flagged as an outlier); and claim submissions from claimants for similar treatments and ailments.

Users in a medical claim review center may update structured cloud data with claim information, or, it may be automatically entered by a separate automation mechanism. Aspects of the present invention then analyze and compared the input data against the data from multiple historic data and criteria sources, as determined by a medical insurance provider or other user or service provider. The determinations of FIG. 4 may thus determine how well the data from a current claim aligns with invoices from other players in the insurance industry, limits and standards set by claim types and benefits chosen by a claimant, data analytics derived from past history of claim submissions by a claimant, claim submissions from claimants with similar claim fact patterns and inputs, and still other appropriate compared data will be apparent to one skilled in the art.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for a structured cloud data analyzer, the method comprising executing on a computer processor the steps of:
    comparing data in each of a plurality of cells of a first range of spreadsheet file cells to data in each of a plurality of cells of a second range of spreadsheet file cells that is different from the first range of cells;
    determining a scope of a first formula with respect to selected cells of the first range of cells and selected cells of the second range of cells, wherein the first formula pulls input data from the selected cells of the first range of cells and pulls input data from selected cells of the second range of cells or responsively generates output data to revise the data within each of the selected output cells of the second range of cells; and
    automatically generating a review flag in association with data in a flagged cell selected from one of the first range of cells and the second range of cells in response to determining that a specified percentage of data values in respective corresponding rows or columns of the first range of cells and the second range of cells match, and that a location of the flagged cell within one of the first range of cells and the second range of cells is shifted by at least one row or column from a corresponding cell within another of the first range of cells and the second range of cells.

2. The method of claim 1, wherein the step of automatically generating the review flag in association with data in the flagged cell is further in response to:
    comparing a trend of changing values over time for the first range of cells against a curve of expected values; and
    identifying the flagged cell as an outlier as a function of failing to match the curve of expected values.

3. The method of claim 1, wherein the step of automatically generating the review flag in association with data in the flagged cell is further in response to determining that a format of the data of the flagged cell fails to correspond to a format of the data of the corresponding cell; and the method further comprising:
    automatically revising the format of the flagged cell data to conform to the format of the corresponding cell data.

4. The method of claim 1, further comprising:
    identifying an additional formula that pulls input data from same ones of a subset of the selected cells of the first range of cells relative to the first formula;
    creating a list for the identified subset of the selected cells of the first range of cells;
    updating each of the listed cells with tallies of usage counts by respective ones of the first formula and the additional formula; and
    flagging any of the listed cells for review that have tallies of usage counts of zero, or of a higher usage count value than a non-zero usage count value of another of the listed cells.

5. The method of claim 1, further comprising:
    integrating computer-readable program code into a computer system comprising the processor, a computer readable memory in circuit communication with the processor, and a computer readable storage medium in circuit communication with the processor; and
    wherein the processor executes program code instructions stored on the computer-readable storage medium via the computer readable memory and thereby performs the steps of comparing the data in the first range of spreadsheet file cells to the data in the second range of spreadsheet file cells, determining the scope of the first formula with respect to the selected cells of the first range of cells and the selected cells of the second range of cells, and automatically generating the review flag in association with the data in the flagged cell selected from one of the first range of cells and the second range of cells in response to determining that the specified percentage of data values in respective corresponding rows or columns of the first range of cells and the second range of cells match and that a location of the flagged cell within one of the first range of cells and the second range of cells is shifted by at least one row or column from a corresponding cell within another of the first range of cells and the second range of cells.

6. The method of claim 5, further comprising:
    providing the integrated computer-readable program code as a service in a cloud environment.

7. The method of claim 1, wherein the step of automatically generating the review flag in association with data in the flagged cell is further in response to:
    determining that the first formula is pulling input data from a first set of row or column locations of the first range of spreadsheet file cells, and from another set of row or column locations of the second range of spreadsheet file cells that are different from the first set of row or column locations, wherein the first set of row or column locations and the second set of row or column locations may be on a same sheet or on different respective sheets of a spreadsheet file or within different respective spreadsheet files; and
    determining that locations of all of information items in the first set of row or column locations of the first range of cells fail to match locations of corresponding information items in all of the second set of row or column locations of the second range of cells, wherein the information items comprise at least one of formulas, data values, and format values.

8. The method of claim 7, wherein the step of automatically generating the review flag in association with data in the flagged cell is further in response to:

determining that a third look-up formula populates a plurality of spreadsheet file cells at a third, end product set of row or column locations via reference to lookup table data that is defined by the first set of row or column locations of the first range of cells, and wherein the lookup table data is pulled via the first formula from an originating table comprising the second set of row or column locations of the second range of cells; and in response to a user addition of new rows or columns to the originating table that correspondingly increases a number of the rows or columns within the originating table defined by the set of row or column locations of the second range of cells to a revised second number of rows or columns within the second range of cells, determining that the third look-up formula refers to a number of rows or columns that is less than the revised second number of rows or columns within the set of row or column locations of the second range of cells.

9. The method of claim 7, wherein the step of automatically generating the review flag in association with data in the flagged cell is further in response to:

determining that a heading of the first set of rows or columns of the first range of cells differs in text content from a heading of the second set of rows or columns of the second range of cells.

10. The method of claim 1, further comprising:

reviewing data in a plurality of neighboring cells that are each located in a neighboring set of row or column locations that is adjacent to and outside of a first set of set of row or column locations of the first range of cells; and wherein the step of automatically generating the review flag in association with data in the flagged cell is further in response to determining a similarity of the reviewed data of the plurality of neighboring cells to the data within the set of row or column locations of the first range of cells as a function of data type, number values, text values, or date values.

11. The method of claim 10, further comprising:

automatically extending the scope of the first formula to the neighboring cells in response to determining the similarity of the reviewed data of the plurality of neighboring cells to the data within the first set of row or column locations of the first range of cells.

12. A system, comprising:

a processor;

a computer readable memory in circuit communication with the processor; and a computer readable storage medium in circuit communication with the processor;

wherein the processor executes program instructions stored on the computer-readable storage medium via the computer readable memory and thereby:

compares data in each of a plurality of cells of a first range of spreadsheet file cells to a data in each of a plurality of cells of a second range of spreadsheet file cells that is different from the first range of cells;

determines a scope of a first formula with respect to selected cells of the first range of cells and selected cells of the second range of cells, wherein the first formula pulls input data from the selected cells of the first range of cells and pulls input data from selected cells of the second range of cells or responsively generates output data to revise the data within each of the selected output cells of the second range of cells; and automatically generates a review flag in association with data in a flagged cell selected from one of the first range of cells and the second range of cells in response to determining that a specified percentage of data values in respective corresponding rows or columns of the first range of cells and the second range of cells match, and that a location of the flagged cell within one of the first range of cells and the second range of cells is shifted by at least one row or column from a corresponding cell within another of the first range of cells and the second range of cells.

13. The system of claim 12, wherein the processor executes the program instructions stored on the computer-readable storage medium via the computer readable memory and thereby:

automatically generates the review flag in association with data in the flagged cell in response to comparing a trend of changing values over time for the first range of cells against a curve of expected values; and identifies the flagged cell as an outlier as a function of failing to match the curve of expected values.

14. The system of claim 12, wherein the processor executes the program instructions stored on the computer-readable storage medium via the computer readable memory and thereby:

automatically generates the review flag in association with data in the flagged cell in response to determining that a format of the data of the flagged cell fails to correspond to a format of the data of the corresponding cell, and automatically revises the format of the flagged cell data to conform to the format of the corresponding cell data.

15. The system of claim 12, wherein the processor executes the program instructions stored on the computer-readable storage medium via the computer readable memory and thereby:

identifies an additional formula that pulls input data from same ones of a subset of the selected cells of the first range of cells relative to the first formula;

creates a list for the identified subset of the selected cells of the first range of cells;

updates each of the listed cells with tallies of usage counts by respective ones of the first formula and the additional formula; and flags any of the listed cells for review that have tallies of usage counts of zero, or of a higher usage count value than a non-zero usage count value of another of the listed cells.

16. The system of claim 12, wherein the processor executes the program instructions stored on the computer-readable storage medium via the computer readable memory and thereby automatically generates the review flag in association with data in the flagged cell in response to:

determining that the first formula is pulling input data from a first set of row or column locations of the first range of spreadsheet file cells, and from another set of row or column locations of the second range of spreadsheet file cells that are different from the first set of row or column locations, wherein the first set of row or column locations and the second set of row or column locations may be on a same sheet or on different respective sheets of a spreadsheet file or within different respective spreadsheet files; and determining that locations of all of information items in the first set of row or column locations of the first range of cells fail to match locations of corresponding information items in all of the second set of row or column locations of the second range of cells, wherein the information items comprise at least one of formulas, data values, and format values.

17. A computer program product for a structured cloud data analyzer, the computer program product comprising:
a computer readable storage medium having computer readable program code embodied therewith, wherein the computer readable storage medium is not a transitory signal per se, the computer readable program code comprising instructions for execution by a processor that cause the processor to:
compare data in each of a plurality of cells of a first range of spreadsheet file cells to a data in each of a plurality of cells of a second range of spreadsheet file cells that is different from the first range of cells;
determine a scope of a first formula with respect to selected cells of the first range of cells and selected cells of the second range of cells, wherein the first formula pulls input data from the selected cells of the first range of cells and pulls input data from selected cells of the second range of cells or responsively generates output data to revise the data within each of the selected output cells of the second range of cells; and
automatically generate a review flag in association with data in a flagged cell selected from one of the first range of cells and the second range of cells in response to determining
that a specified percentage of data values in respective corresponding rows or columns of the first range of cells and the second range of cells match, and that a location of the flagged cell within one of the first range of cells and the second range of cells is shifted by at least one row or column from a corresponding cell within another of the first range of cells and the second range of cells.

18. The computer program product of claim 17, wherein the computer readable program code instructions for execution by the processor further cause the processor to:
automatically generate the review flag in association with data in the flagged cell in response to comparing a trend of changing values over time for the first range of cells against a curve of expected values; and
identify the flagged cell as an outlier as a function of failing to match the curve of expected values.

19. The computer program product of claim 17, wherein the computer readable program code instructions for execution by the processor further cause the processor to:
automatically generate the review flag in association with data in the flagged cell in response to determining that a format of the data of the flagged cell fails to correspond to a format of the data of the corresponding cell, and
automatically revise the format of the flagged cell data to conform to the format of the corresponding cell data.

20. The computer program product of claim 17, wherein the computer readable program code instructions for execution by the processor further cause the processor to:
identify an additional formula that pulls input data from same ones of a subset of the selected cells of the first range of cells relative to the first formula;
create a list for the identified subset of the selected cells of the first range of cells;
update each of the listed cells with tallies of usage counts by respective ones of the first formula and the additional formula; and
flag any of the listed cells for review that have tallies of usage counts of zero, or of a higher usage count value than a non-zero usage count value of another of the listed cells.

* * * * *